(12) United States Patent
Tsutsumi

(10) Patent No.: US 9,694,390 B1
(45) Date of Patent: Jul. 4, 2017

(54) ROTARY INTERSTAGE SCREEN APPARATUS

(71) Applicant: Masataka Tsutsumi, Canton, OH (US)

(72) Inventor: Masataka Tsutsumi, Canton, OH (US)

(73) Assignee: Sizetec, Inc., Canton, OH (US)

( * ) Notice: Subject to any disclaimer, the term of this patent is extended or adjusted under 35 U.S.C. 154(b) by 0 days.

(21) Appl. No.: 15/262,387

(22) Filed: Sep. 12, 2016

(51) Int. Cl.
| | | |
|---|---|---|
| D01G 23/08 | (2006.01) |
| B07B 1/22 | (2006.01) |
| B01D 33/46 | (2006.01) |
| B01D 33/11 | (2006.01) |
| B01D 33/76 | (2006.01) |
| B01D 33/80 | (2006.01) |
| C22B 3/00 | (2006.01) |
| C22B 11/08 | (2006.01) |
| C22B 3/22 | (2006.01) |
| C22B 3/12 | (2006.01) |
| C22B 3/16 | (2006.01) |
| B07B 1/55 | (2006.01) |
| B07B 1/42 | (2006.01) |

(52) U.S. Cl.
CPC ............... *B07B 1/22* (2013.01); *B01D 33/11* (2013.01); *B01D 33/463* (2013.01); *B01D 33/76* (2013.01); *B01D 33/801* (2013.01); *B07B 1/42* (2013.01); *B07B 1/55* (2013.01); *C22B 3/12* (2013.01); *C22B 3/16* (2013.01); *C22B 3/22* (2013.01); *C22B 11/04* (2013.01); *C22B 11/08* (2013.01)

(58) Field of Classification Search
CPC .... B07B 1/22; B07B 1/42; B07B 1/55; B01D 33/11; B01D 33/76; B01D 33/463; B01D 33/801
USPC .............. 209/259, 270, 288, 289, 290
See application file for complete search history.

(56) References Cited

U.S. PATENT DOCUMENTS

| | | | | | |
|---|---|---|---|---|---|
| 3,658,263 | A | * | 4/1972 | Zeisler ................. | B02C 17/002 241/167 |
| 4,038,187 | A | * | 7/1977 | Saffran ................. | B01D 33/067 210/108 |
| 4,097,379 | A | * | 6/1978 | Shelstad .............. | B01D 33/073 210/167.31 |
| 4,538,327 | A | * | 9/1985 | Einarsson ............ | A22C 29/005 209/290 |
| 4,915,826 | A | * | 4/1990 | Nordhus ............... | B07B 1/24 209/247 |
| 5,305,533 | A | * | 4/1994 | Alexander ........... | F26B 11/028 34/108 |
| 5,490,928 | A | * | 2/1996 | Tanii ................... | B03B 5/56 209/240 |
| 6,227,379 | B1 | * | 5/2001 | Nesseth ............... | B01D 33/215 209/270 |
| 6,868,973 | B1 | * | 3/2005 | Kamo ................... | B01D 33/11 162/380 |

(Continued)

FOREIGN PATENT DOCUMENTS

CN          204112157      *  1/2015

*Primary Examiner* — Terrell Matthews
(74) *Attorney, Agent, or Firm* — Buckingham, Doolittle & Burroughs, LLC

(57) ABSTRACT

An apparatus for separating carbon or resin from slurry. The apparatus comprises a frame, a rotary cage screen assembly, a cage screen support and rotary drive system, a carbon collection assembly and a hopper moveably connected to the rotary cage screen assembly. The apparatus is positional partially within an adsorption tank or other container capable of containing slurry.

17 Claims, 4 Drawing Sheets

(56) References Cited

U.S. PATENT DOCUMENTS 7,357,259 B2 * 4/2008 Johannsen ................ B03B 5/42
209/162
7,360,655 B2 * 4/2008 Johannsen ................ B03B 5/42
209/162

* cited by examiner

ROTARY INTERSTAGE SCREEN APPARATUS

FIELD OF THE INVENTION

This invention pertains generally to an apparatus for separating coarse solid material from slurry, and more particularly to a rotary interstage screen apparatus for removing carbon particles from a slurry mixture through a revolving screen.

BACKGROUND

In the field of ore processing, activated carbon is commonly used to adsorb and recover precious metals such as gold. Both carbon-in-pulp (CIP) and carbon-in-leach (CIL) processes are commonly used where activated carbon is injected into adsorption tanks after leaching gold ore with cyanide. A typical gold extraction system involves several large agitated tanks oriented in either a horizontal series or cascade system. Alkaline slurry moves downstream from tank to tank and activated carbon is introduced into the system moving upstream. The loaded activated carbon is then extracted from the slurry via some sort of screening apparatus and pumped out of the system.

These methods of gold recovery are time consuming and require continuous operation to be most effective. Unfortunately, existing screening apparatuses have many disadvantages. Most systems use a metal drive chain to rotate a vertically disposed rotary screen cage. The drive chains are metal and are exposed to alkaline solutions causing chemical breakdown in addition to the normal mechanical wear which requires frequent maintenance and replacement. Another common problem is that these screens frequently become irreversibly pegged or blinded by particulate matter as material clogs the screening material. Blinding occurs when wet material clumps up and sticks to the screen surface. This can result in a significant loss of screen open area resulting in a decrease in flow capacity. These screening apparatuses are adversely affected by the lower flow rates created by the clogged screens. These apparatuses require full flow of the slurry or pulp to maintain solids in suspension, so phase separation can occur when in a low or no flow condition decreasing efficiency. The only way to unclog the system requires frequent time consuming manual removal and cleaning of the screening material resulting in lost production.

Consequently, there exists a need for an apparatus that is useable in with both CIP and CIP processes that circumvents the known problems and is more efficient at removing the loaded activated carbon from the slurry. The present invention discloses an apparatus for separating course solid particles from a slurry solution without drive chain wear or frequent blinding. This invention decreases the cost of the frequent maintenance inherent in known systems and allows the processes of gold recovery to continue without interruption improving efficiency.

SUMMARY

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises an apparatus for separating solid particles from a slurry mixture. The apparatus comprises a rotary cage screen assembly, a collection assembly suspended within the rotary cage screen assembly, and a hopper moveably connected to the rotary cage screen assembly by a plurality of hydraulic seals. The apparatus further comprises a plurality of drive tires for rotating the rotary cage screen assembly, and a spraying apparatus for cleaning the rotary cage screen assembly.

Furthermore, in a preferred embodiment of the invention, the rotary cage screen assembly comprises a plurality of lifter elements for collecting the solid particles as the rotary cage screen assembly rotates and deposition the solid particles into the collection assembly for removal from the apparatus. The apparatus further comprises a pair of launder chutes for introducing the slurry into the rotary cage screen assembly. The hydraulic seals are labyrinth seals connecting the launder chutes to the rotary cage screen assembly and sealing the hopper from the rotary cage screen assembly. Once the solid particles are collected, the remaining slurry passes through the rotary cage screen assembly into the hopper for removal from the apparatus.

In another preferred embodiment, the subject matter disclosed and claimed herein, in one aspect thereof, comprises an apparatus for separating trash particles from a slurry mixture. The apparatus comprises a rotary cage screen assembly, a trash collection assembly suspended within the rotary cage screen assembly, a hopper connected to the rotary cage screen assembly, and a slurry inlet pipe penetrating the rotary cage screen assembly. The apparatus further comprises a plurality of drive tires for rotating the rotary cage screen assembly, and a spraying apparatus for cleaning the rotary cage screen assembly.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
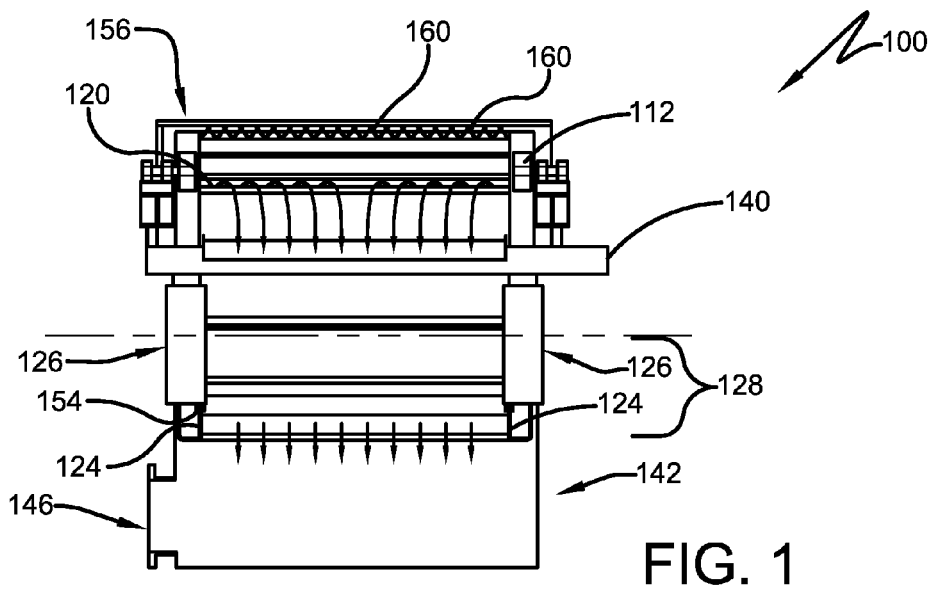
FIG. 1 illustrates a side view of an apparatus for separating course solid particles from a slurry in accordance with the disclosed architecture.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter. The invention relates generally to an apparatus for removing solid particles from a slurry mixture.

The apparatus is typically used in conjunction with a plurality of adsorption tanks, or any other type of holding tank or container, oriented in either a horizontal series or cascade system, such as but not limited to tanks used in CIL and CIP processes, agitated tanks, and the like. The particles may be activated carbon loaded with aurocyanide ions, trash particles, or any other type of particulate matter dimensioned so as not to fit through a screening material. The slurry may be a liquid solution such as but not limited to alkaline slurry, ore slurry, a semi-liquid solution, a suspension mixture, a fine and course particulate mixture, or any type of mixture of different dimensioned materials that require separation as is known to one of skill in the art.

The slurry solution loaded with particles may be introduced into a circuit of tanks where the slurry moves downstream from tank to tank. Activated carbon may be introduced into the circuit downstream and be moved upstream through the circuit flowing opposite the slurry flow. Spent slurry with the particles removed exits downstream for disposal. Loaded activated carbon is removed from the circuit upstream for additional processing. Each tank may have one of the apparatuses placed partially within the tank so that the apparatus is partially submerged in the slurry solution as described infra.

Figure 2:
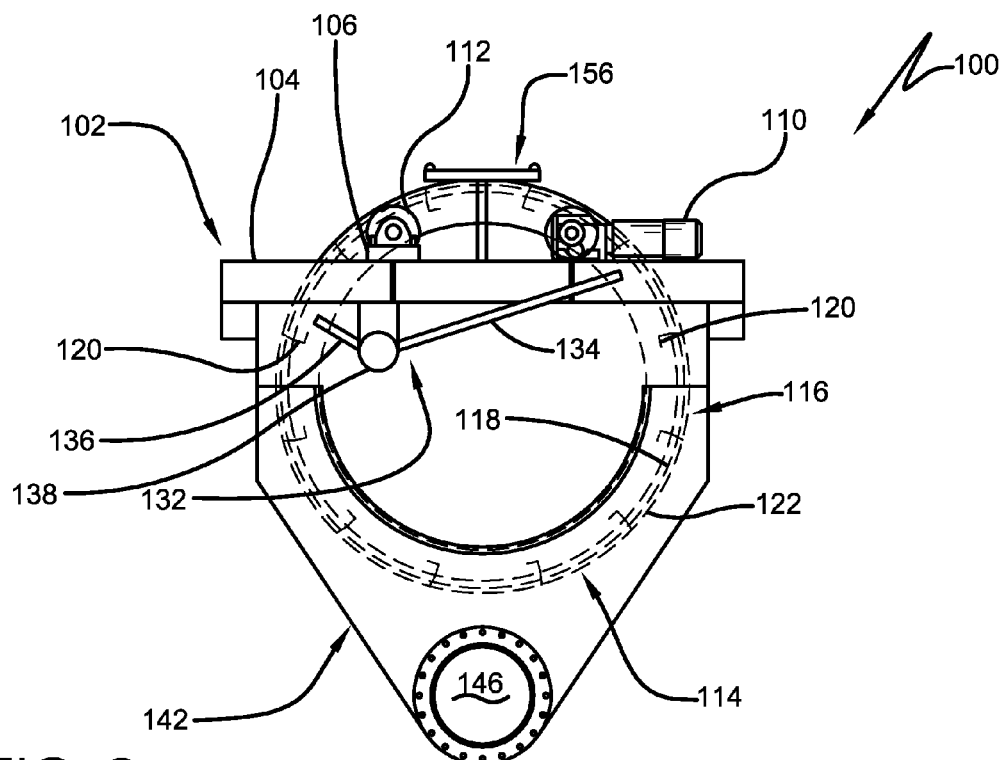
FIG. 2 illustrates an end view of the apparatus in accordance with the disclosed architecture.

Referring initially to the drawings FIGS. 1 and 2 illustrate an apparatus 100 for separating course solid particles from a slurry in a container. The apparatus 100 comprises a frame 102, a plurality of motors 110, a plurality of drive tires 112, and a rotary cage screen assembly 114. The frame 102 comprises a pair of beams 104 each comprising a plurality of attachment points 106. The pair of beams 104 ore oriented so that there is a beam adjacent to each end of the rotary cage screen assembly 114. Each beam 104 extends spanning the tank and holding the apparatus 100 suspended within the tank. The plurality of attachment points 106 are located on each beam 104 so as to engage the plurality of drive tires 112. Each drive tire 112 is rotatably mounted to the corresponding attachment point 106 via a bearing or similar rotational connection. One of the drive tires 112 on each side is in electrical communication with one of the plurality of motors 110 which is also attached to the beam 104 adjacent to the drive tire 112.

The apparatus 100 further comprises a hopper 142 for containing the slurry once the course solid particles have been removed. The hopper 142 is suspended from the frame 102. The hopper 142 is typically manufactured from a solid nonporous material and is dimensioned so that the slurry will collect at a bottom of the hopper 142. The hopper 142 comprises a slurry discharge outlet 146 located at the bottom of the hopper 142 for discharging the slurry from the apparatus 100 once the course solid materials have been separated out of the slurry.

The rotary cage screen assembly 114 comprises a cylindrical cage portion 116, a plurality of lifter elements 120, and a pair of end walls 124. The cylindrical cage portion 116 comprises an inner diameter 118 and an outer diameter 122. The cylindrical cage portion 116 is typically manufactured from polyurethane screen, such as but not limited to wedge wire, wire cloth screen, and the like. The screen used for the cylindrical cage portion 116 is dimensioned to separate out particles as small as 50 microns. While the screen size may vary, it is dimensioned to permit the slurry to pass through the screen into the hopper 142 while still containing the carbon or other particles within the cylindrical cage portion 116.

The rotary cage screen assembly 114 further comprises a rail and a rim that extends the cylindrical cage portion 116 past each of the end walls 124. The plurality of drive tires 112 engage the rail and the rim so that the drive tires 112 are positioned slightly within the cylindrical cage portion 116 adjacent and external to the end wall 124. The plurality of drive tires 112 abuts the inner diameter 118 of the cylindrical cage portion 116. As one of the motors 110 drives the corresponding drive tire 112, the drive tire 112 rotates and engages the inner diameter 118 by friction thereby spinning the rotary cage screen assembly 114. This is advantageous as it eliminates the need for a high maintenance alternative such as a drive chain or friction belt.

The plurality of lifter elements 120 are attached to the inner diameter 118 of the cylindrical cage portion 116. Each of the plurality of lifter elements 120 are oriented parallel to each other and run substantially from end wall 124 to end wall 124. Each of the plurality of lifter elements 120 is dimensioned so as to be able to collect the carbon particles and rotate them to the top of the cylindrical cage portion 116. While the plurality of lifter elements 120 typically range in number four to twenty four, the apparatus 100 only needs at least one to function.

Each end wall 124 comprises a slurry inlet 126 which is an opening of sufficient diameter to allow slurry and particles to enter the rotary cage screen assembly 114. When the apparatus 100 is placed into the tank, the slurry inlet 126 is partially submerged within the slurry creating a submerged portion 128 of the rotary cage screen assembly 114. Typically the submerged portion 128 is less than half the diameter of the cylindrical cage portion 116.

The apparatus 100 further comprises a course solid collection assembly 132 for collecting and removing the course solid particles. The course solid collection assembly 132 is suspended within the rotary cage screen assembly 114 transecting the cylindrical cage portion 116 through the slurry inlets 126 of the end walls 124. The course solid collection assembly 132 comprises a first tray 134, a second tray 136, a collection portion 138, and a carbon discharge pipe 140. The first tray 134 and the second tray 136 are typically oriented at an obtuse angle and terminate into the collection portion 138 which is fed by the first tray 134 and the second tray 136. The course solid collection assembly 132 is located within the cylindrical cage portion 116 at a level above the submerged portion 128.

The first tray 134 and the second tray 136 extend outward from the collection portion 138 toward the inner diameter 118 of the cylindrical cage portion 116. As the drive tires 112 rotate the rotary cage screen assembly 114, the plurality of lifters 120 collect the solid particles below the submerged portion 128 while the remaining slurry penetrates the screen and flows in to the hopper 142. As the cylindrical cage portion 116 rotates upward, the plurality of lifters 120 emerge from the submerged portion 128 rotating upward. Once the plurality of lifters 120 rotate above the horizontal, the solid particles fall off of the plurality of lifters 120 by gravity into the first and second trays 134 and 136. The first and second trays 134 and 136 direct the solid particles into the collection portion 138 which extends out of the cylindrical cage portion 116 and into the carbon discharge pipe 140 connected to the collection portion 138.

The apparatus 100 further comprises a spray apparatus 156. The spray apparatus 156 is connectable to a water source and comprises a plurality of nozzles 160. The spray apparatus 156 is attached to the frame 102 and may be located external to and above the rotary cage screen assembly 114, or alternatively within the cylindrical cage portion 116 above the level of the submerged portion 128. The spray apparatus 156 is designed to flow water through the plurality of nozzles 160 and onto the screen of the cylindrical cage portion 116. The spray unclogs or unblinds any wet material that can clog the screen, thereby keeping the apparatus 100 in service without the need to remove the rotary cage screen assembly 114 for manual cleaning.

Figure 3:
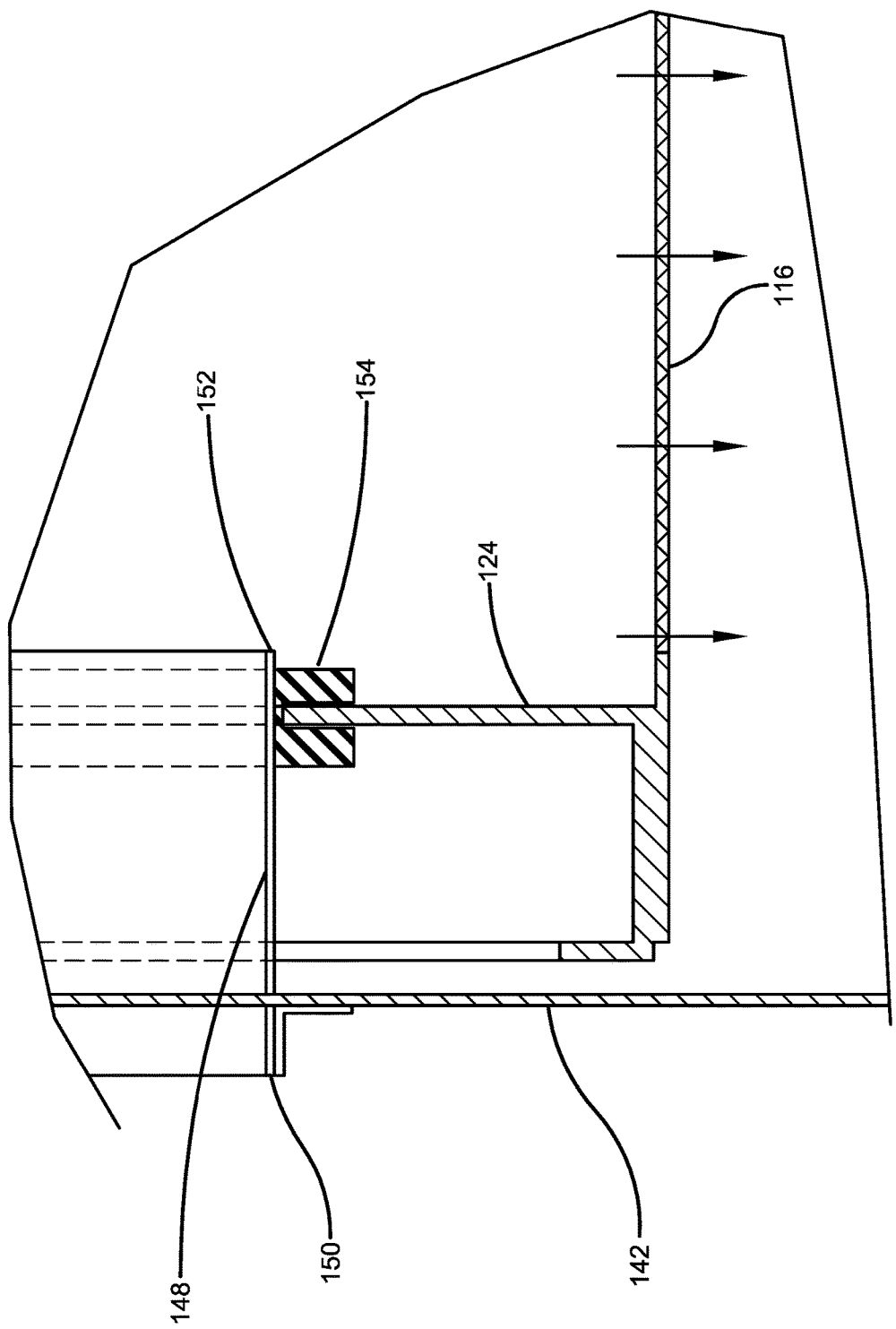
FIG. 3 illustrates a cutaway view of a hydraulic seal of the apparatus in accordance with the disclosed architecture.

As illustrated in FIG. 3, the apparatus 100 further comprises a plurality of hydraulic seals 154 and a pair of launder chutes 148. Each hydraulic seal 154 is typically a labyrinth seal that moveably connects the rotary cage screen assembly 114 to the hopper 142. Each of the plurality of hydraulic seals 154 is oriented to obstruct the flow of the carbon particles from the cylindrical cage portion 116 into the hopper 142.

The pair of launder chutes 148 each comprise an outside end 150 and an inside end 152. The outside end 150 is attached to the hopper 142 and is open to the tank. Each launder chute 148 extends inward past one of the pair of end walls 124, through the slurry inlet 126 and into the cylindrical cage portion 116 of the rotary cage screen assembly 114 terminating in the inside end 152. Each hydraulic seal 154 is attached to one of the inside ends 152 of the corresponding launder chute 148 thereby moveably sealing the corresponding end wall 124 of the rotary cage screen assembly 114 to the hopper 142. This keeps the carbon particles within the cylindrical cage portion 114 until they can be collected by one of the plurality of lifters 120 to be deposited in the course solid collection assembly 132 and removed from the apparatus 100 via the carbon discharge pipe 140.

Figure 4:
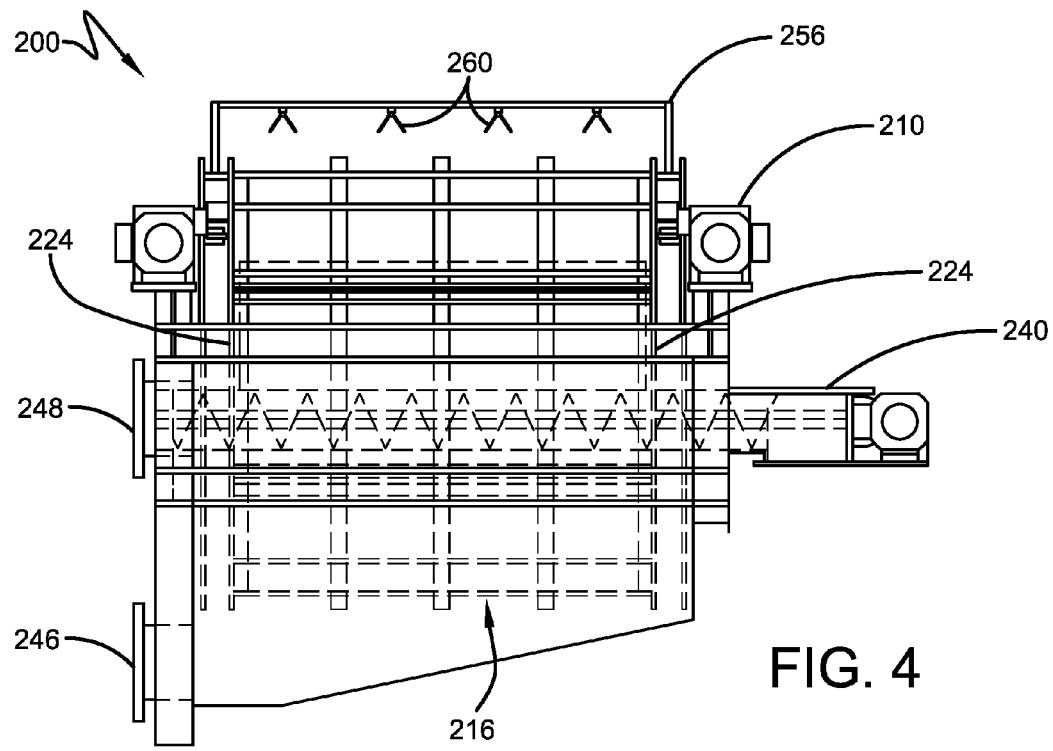
FIG. 4 illustrates a side view of an apparatus for separating trash particles from a slurry in accordance with the disclosed architecture.
Figure 5:
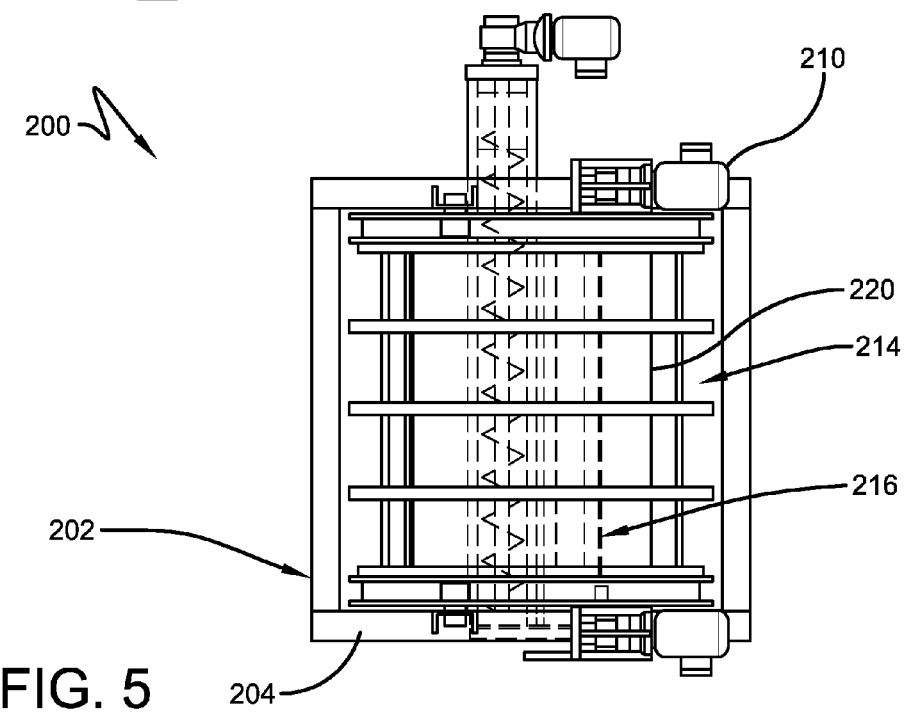
FIG. 5 illustrates an overhead view of the apparatus in accordance with the disclosed architecture.
Figure 6:
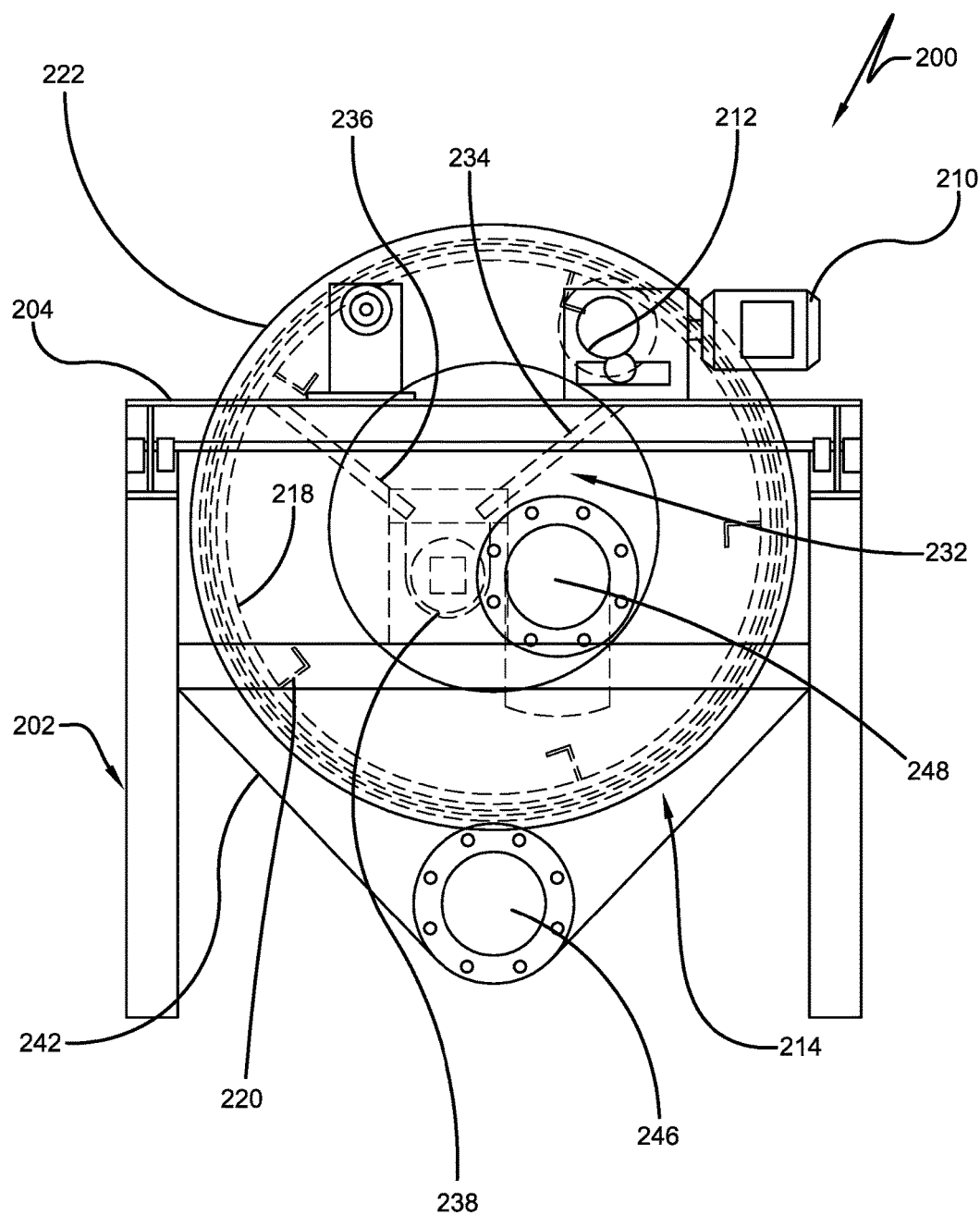
FIG. 6 illustrates an end view of the apparatus in accordance with the disclosed architecture.

FIGS. 4-6 illustrate an apparatus 200 for separating trash particles from a slurry that is not used in conjunction with a container such as an adsorption tank. The apparatus 200 is self-contained and does not need to be partially submerged in the slurry.

The apparatus 200 comprises a frame 202, a plurality of motors 210, a plurality of drive tires 212, and a rotary cage screen assembly 214. The frame 202 comprises a plurality of beams 204 that form a support structure for the apparatus 200. The frame 202 further comprises a plurality of attachment points located on the plurality of beams 204 adjacent to each end of the rotary cage screen assembly 214. Each of the plurality of attachment points engages one of the plurality of drive tires 212. Each drive tire 212 is rotatably mounted to the corresponding attachment point via a bearing or similar rotational connection. One of the drive tires 212 on each side is in electrical communication with one of the plurality of motors 210 which is also attached to the plurality of beams 204 adjacent to the drive tire 212.

The apparatus 200 further comprises a hopper 242 for containing the slurry once the course solid particles have been removed. The hopper 242 is suspended from the frame 202. The hopper 242 is dimensioned so that the slurry will collect at a bottom of the hopper 242. The hopper 242 comprises a slurry discharge outlet 246 located at the bottom of the hopper 242 for discharging the slurry from the apparatus 200 once the course solid materials have been separated out of the slurry.

The rotary cage screen assembly 214 comprises a cylindrical cage portion 216, a plurality of lifter elements 220, and a pair of end walls 224. The cylindrical cage portion 216 comprises an inner diameter 218 and an outer diameter 222. The rotary cage screen assembly 214 further comprises a rim and a rail that extends the cylindrical cage portion 216 past each of the end walls 224. The plurality of drive tires 212 engage the rim and the rail so that the drive tires 212 are positioned slightly within the cylindrical cage portion 216 adjacent and external to the end wall 224. The plurality of drive tires 212 abuts the inner diameter 218 of the cylindrical cage portion 216. As one of the motors 210 drives the corresponding drive tire 212, the drive tire 212 rotates and engages the inner diameter 218 by friction thereby spinning the rotary cage screen assembly 214.

The plurality of lifter elements 220 are attached to the inner diameter 218 of the cylindrical cage portion 216. Each of the plurality of lifter elements 220 are oriented parallel to each other and run substantially from end wall 224 to end wall 224. Each of the plurality of lifter elements 220 is dimensioned so as to be able to collect the course solid particles and rotate them to the top of the cylindrical cage portion 216.

The apparatus 200 further comprises a slurry inlet pipe 248. The slurry inlet pipe 248 penetrates one of the end walls 224 directing the slurry into the rotary cage screen assembly 214. The slurry inlet pipe 248 comprises an opening on a bottom portion of the slurry inlet pipe 248 inside the rotary cage screen assembly 214 for allowing the slurry to drop into the cylindrical cage portion 216. The slurry inlet pipe 248 may further comprise a diffuser located below the opening of and attached to the slurry inlet pipe 248 to spread the slurry out within the cylindrical cage portion 216.

The apparatus 200 further comprises a trash collection assembly 232 for collecting and removing the trash particles. The trash collection assembly 232 is suspended within the rotary cage screen assembly 214 transecting the cylindrical cage portion 216 through the end walls 224. The trash collection assembly 232 comprises a first tray 234, a second tray 236, a collection portion 238, and a trash discharge pipe 240. The first tray 234 and the second tray 236 are typically oriented at an obtuse angle and terminate into the collection portion 238 which is fed by the first tray 234 and the second tray 236. The trash collection assembly 232 is located within the cylindrical cage portion 216.

The first tray 234 and the second tray 236 extend outward from the collection portion 238 toward the inner diameter 218 of the cylindrical cage portion 216. As the drive tires 212 rotate the rotary cage screen assembly 214, the plurality of lifters 220 collect the trash particles while the remaining slurry penetrates the screen and flows in to the hopper 242. As the cylindrical cage portion 216 rotates upward, the plurality of lifters 220 rotate upward. Once the plurality of lifters 220 rotate above the horizontal, the trash particles fall off of the plurality of lifters 220 by gravity into the first and second trays 234 and 236. The first and second trays 234 and 236 direct the trash particles into the collection portion 238 which extends out of the cylindrical cage portion 216 and into the trash discharge pipe 240 connected to the collection portion 238. The collection portion 238 may comprise a screened opening so as to allow any remaining slurry to fall back into the cylindrical cage portion 216. The trash collection assembly 232 may also further comprise a screw or worm drive located within the collection portion 238 to assist in directing the trash particles into the trash discharge pipe 240.

The apparatus 200 further comprises a spray apparatus 256. The spray apparatus 256 is connectable to a water source and comprises a plurality of nozzles 260. The spray apparatus 256 is attached to the frame 202 and may be located external to and above the rotary cage screen assembly 214, or alternatively within the cylindrical cage portion 216. The spray apparatus 256 is designed to flow water through the plurality of nozzles 260 and onto the screen of the cylindrical cage portion 216. The spray unclogs or unblinds any wet material that can clog the screen, thereby keeping the apparatus 200 in service without the need to remove the rotary cage screen assembly 214 for manual cleaning.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for separating course solid particles from a slurry in a container comprising:
   a frame;
   a plurality of motors attached to the frame;
   a plurality of drive tires rotatably mounted to the frame in electrical communication with the plurality of motors;
   a rotary cage screen assembly comprising a cylindrical cage portion rotatably supported by the plurality of drive tires, a plurality of lifters elements attached the cylindrical cage portion, and a pair of end walls; and
   a course solid collection assembly comprising a first tray, a second tray, and a collection portion fed by the first and second trays, the course solid collection assembly suspended within the rotary cage screen assembly for collecting and removing the course solid particles;
   a hopper suspended from the frame for containing the slurry once the course solid particles have been removed; and
   a plurality of hydraulic seals moveably connecting the rotary cage screen assembly and the hopper; and
   a spraying apparatus attached to the frame for cleaning the rotary cage screen assembly.

2. The apparatus of claim 1, wherein the plurality of drive tires is located within the rotary cage screen assembly and abuts an inner diameter of the cylindrical cage portion.

3. The apparatus of claim 1, wherein the first and second trays are oriented at an obtuse angle terminating in the collection portion.

4. The apparatus of claim 3, wherein each hydraulic seal is a labyrinth seal.

5. The apparatus of claim 1, wherein the spraying apparatus is positionable externally to or internally within the rotary cage screen assembly.

6. An apparatus for separating carbon particles from an ore slurry in an adsorption tank comprising:
   a frame;
   a plurality of motors attached to the frame;
   a plurality of drive tires rotatably mounted to the frame in electrical communication with the plurality of motors;
   a rotary cage screen assembly comprising a cylindrical cage portion rotatably supported by the plurality of drive tires, a plurality of lifters elements attached to an inner diameter of the cylindrical cage portion, and a pair of end walls each comprising a slurry inlet; and
   a carbon collection assembly comprising a first tray, a second tray, and a collection portion fed by the first and second trays, the carbon collection assembly suspended within the rotary cage screen assembly for collecting and removing the carbon particles;
   a hopper suspended from the frame for containing the ore slurry once the carbon particles have been removed; and
   a pair of launder chutes each comprising an outside end attached to the hopper and an inside end extending inward toward one of the pair of end walls, through the slurry inlet, and into the cylindrical cage portion of the rotary cage screen assembly; and
   a pair of labyrinth seals each attached to one of the inside ends of the corresponding launder chute moveably sealing the rotary cage screen assembly to the hopper; and
   a spraying apparatus attached to the frame for cleaning the rotary cage screen assembly.

7. The apparatus of claim 6, wherein the pair of labyrinth seals are oriented to obstruct the flow of carbon particles into the hopper.

8. The apparatus of claim 7, wherein the plurality of lifters collect and separate the carbon particles from the ore slurry as the cylindrical cage portion rotates and deposit the carbon particles in the carbon collection assembly.

9. The apparatus of claim 8, wherein the cylindrical cage portion is manufactured from a screen material dimensioned to permit the ore slurry separated from the carbon particles to pass through into the hopper.

10. The apparatus of claim 6, wherein the spraying apparatus is located either inside or outside of the cylindrical cage portion of the rotary cage screen assembly.

11. The apparatus of claim 6, wherein the spraying apparatus comprises a plurality of nozzles.

12. An apparatus for separating trash particles from a slurry comprising:
   a frame;
   a plurality of motors attached to the frame;
   a plurality of drive tires rotatably mounted to the frame in electrical communication with the plurality of motors;
   a rotary cage screen assembly comprising a cylindrical cage portion rotatably supported by the plurality of drive tires, a plurality of lifters elements attached to the cylindrical cage portion, and a pair of end walls; and
   a trash collection assembly comprising a first tray, a second tray, and a collection portion fed by the first and second trays, the trash collection assembly suspended within the rotary cage screen assembly for collecting and removing the trash particles;
   a hopper suspended from the frame for containing the slurry once the trash particles have been removed; and
   a slurry inlet pipe penetrating the rotary cage screen assembly and extending inward through one of the pair of end walls and into the cylindrical cage portion of the rotary cage screen assembly; and
   a spraying apparatus attached to the frame for cleaning the rotary cage screen assembly.

13. The apparatus of claim 12, wherein the collection portion feeds a trash discharge pipe.

14. The apparatus of claim 12, wherein the plurality of drive tires abuts an inner diameter of the cylindrical cage portion.

15. The apparatus of claim 14, the plurality of drive tires rotate the cylindrical cage portion.

16. The apparatus of claim 15, wherein the hopper comprises a slurry discharge outlet.

17. The apparatus of claim 16, wherein the spraying apparatus comprises a plurality of nozzles.

* * * * *